May 3, 1927.
R. T. SCHOOF
POCKET POSTAL SCALE
Filed Feb. 11, 1926
1,626,976
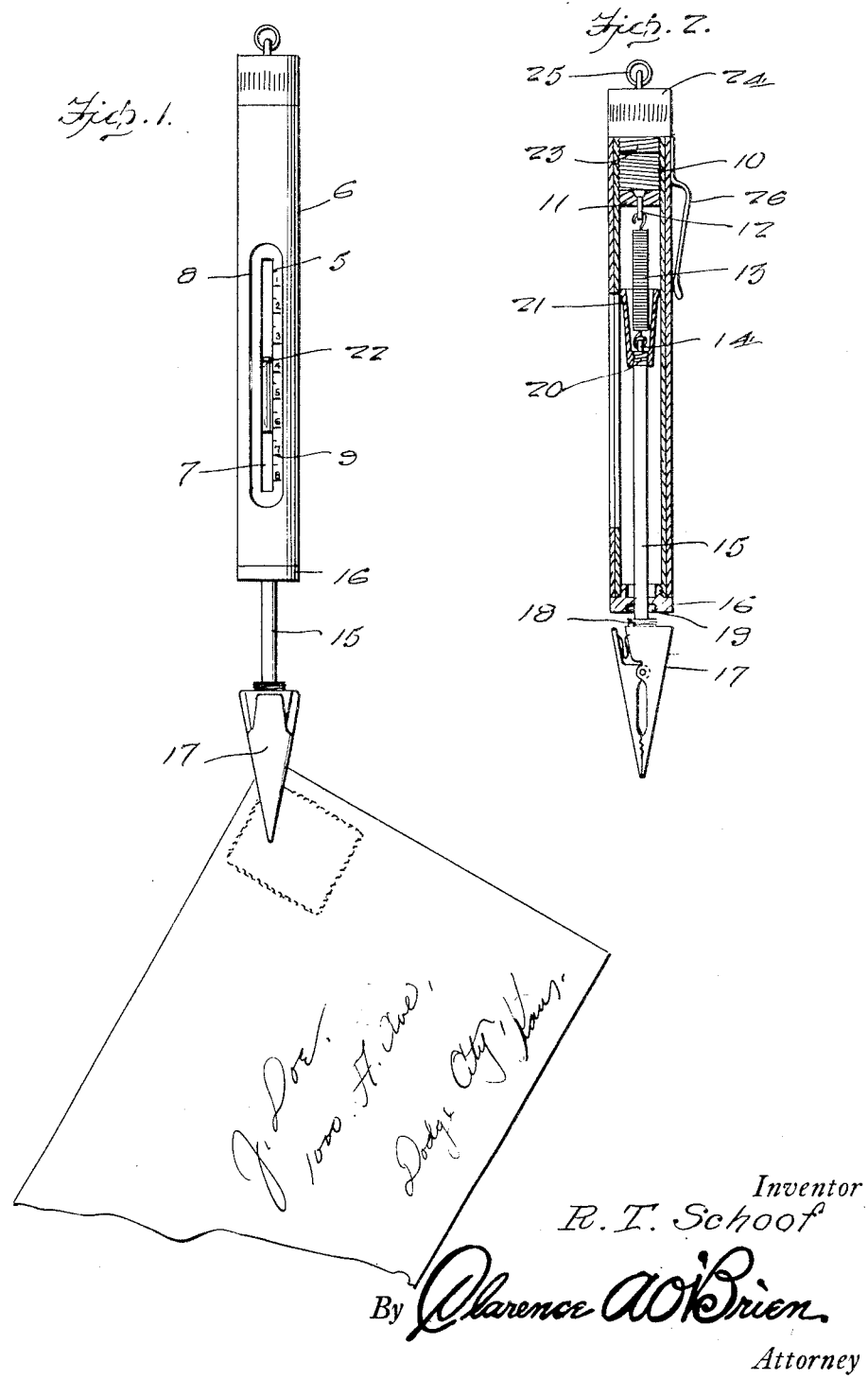
Inventor
R. T. Schoof
By Clarence A. O'Brien
Attorney Patented May 3, 1927.

1,626,976

UNITED STATES PATENT OFFICE.

RALPH T. SCHOOF, OF DODGE CITY, KANSAS.

POCKET POSTAL SCALE.

Application filed February 11, 1926. Serial No. 87,576.

This invention relates to postal scales and aims to provide such a device which may be conveniently carried in the pocket in order that the same will be at all times accessible for use in the weighing of letters, small parcel post packages, etc. etc.

A further and important object is to provide such a postal scale that embodies but few small structural elements but are so co-related as to provide an efficient scale for the purposes intended, and that will simulate, while in the pocket, a fountain pen or pencil.

An additional object of the invention is to provide a pocket scale that may be readily disassembled for cleaning, repair, or renewal purposes.

With the foregoing and other objects in view as the nature of the invention will be better understood, the same comprises the novel form, combination and arrangement of parts hereinafter more fully described and shown in the accompanying drawings and claimed.

In the drawings, wherein like reference characters indicate corresponding parts throughout both of the views:—

Figure 1 is a front elevation of a pocket postal scale constructed in accordance with the present invention, the same being shown as actually in use, and Fig. 2 is a detail vertical section of the same.

Having more particular reference to the drawing, my novel pocket postal scale constitutes the provision of an inner and outer cylinder 5 and 6 of desirable length but are preferably constructed of brass or other metal, and hard rubber or a non-breakable composition respectively. The inner cylinder 5 is formed intermediate its ends with a longitudinal flap 7 while the outer cylinder 6 is provided with a substantially longer and wider slot 8 in order that scale indications 9 upon one edge of the slot 7 may be viewed.

The upper end of the inner cylinder 5 is internally threaded as at 10 for receiving a threaded plug 11 that is preferably slotted at its top side in order that the same may be turned downwardly into the cylinder by a screw driver or other implement. The preferable position of this plug, being at the lower end of the threads within said cylinder as clearly shown in the sectional view, Fig. 2.

Extending through this plug is a pin 12 thru the lower end of which is connected one end of a retractile coiled spring 13, the other end of said spring being connected to an eye 14 upon the upper end of a depending rod 15 that extends downwardly in said cylinder and slidably projects through a closure plug 16 upon the ends of the cylinder, the same having threaded engagement within the inner cylinder as more clearly shown in Fig. 2.

Upon the lower end of the rod 15 is a letter or other article securing clasp 17 that is provided at its top side with a threaded plug 18, adapted for theaded engagement within a threaded socket 19 in the bottom face of said closure plug 16 so as to prevent the sliding of the rod within the cylinder when the scale is not in use. The aforesaid details 18 and 19 form what is hereinafter referred to as "cooperating construction."

The upper end of said rod 15 is threaded as at 20 and threadedly secured thereto is an upwardly extending conical shaped gauge member 20 of aluminum or other suitable light material, the upper end of which is beaded as at 22 to provide a pointer for the scale, it being apparent that when a letter or other article is attached to the cam 17, the rod 15 will move downwardly against the axis of the spring 13 thus actuating the gauge member, the weight of the letter or article being indicated by the position of the gauge with respect to the readings at the edge of the slot 7 in the interior cylinder 5.

There may be, and preferably is provided a strip of mica between the cylinders at the slots therein, for preventing the entrance of dirt into said cylinders. Threaded within the upper end of the inner cylinder 5 is a plug 23 of a closure cap 24, that preferably carries a metal ring 25 in order that the same be secured to a chain or ribbon if desired.

Upon the upper end of the outer cylinder is a conventional pocket clasp 26 in order that the scale may be conveniently secured within the pocket of the owner in simulation of a fountain pen or pencil.

It will thus be seen that I have provided a highly novel, simple, and inexpensive but yet highly efficient pocket postal scale, that is readily adapted for all of the purposes heretofore designated, but even though I have herein shown and described the said scale, comprising certain features of structural elements, it is nevertheless to be understood that modifications may be had therein without departing from the spirit and scope of the appended claim.

Having thus described my invention, what I claim as new and desire to secure by Letters Patent is:

In a pocket postal scale of the character described, a cylinder having a slot intermediate its ends, and scale readings at the exterior thereof, and at one edge of said slot, a retractile coiled spring secured at its upper end within said cylinder, a rod secured to the opposite end of said spring and projecting through the lower end of said cylinder, a letter attaching clasp upon the external end of the rod, a gauge member upon the rod visible through the slot in said cylinder, closure caps at the opposite ends of the cylinder through the lowermost one of which said rod is adapted for sliding movement, and cooperating construction between the clasp and lower closure cap for preventing sliding of the rod when the scale is not in use.

In testimony whereof I affix my signature.

RALPH T. SCHOOF.